(12) United States Patent
Kontturi

(10) Patent No.: US 11,267,211 B2
(45) Date of Patent: Mar. 8, 2022

(54) IMPACT RESISTANT LIGHT GUIDE STRUCTURE

(71) Applicant: NANOCOMP OY LTD, Finland (FI)

(72) Inventor: Ville Kontturi, Finland (FI)

(73) Assignee: NANOCOMP OY LTD, Lehmo (FI)

(*) Notice: Subject to any disclaimer, the term of this patent is extended or adjusted under 35 U.S.C. 154(b) by 170 days.

(21) Appl. No.: 16/647,519

(22) PCT Filed: Sep. 15, 2017

(86) PCT No.: PCT/FI2017/050657
§ 371 (c)(1),
(2) Date: Mar. 15, 2020

(87) PCT Pub. No.: WO2019/053317
PCT Pub. Date: Mar. 21, 2019

(65) Prior Publication Data
US 2020/0269531 A1     Aug. 27, 2020

(51) Int. Cl.
*G02B 6/02* (2006.01)
*B29D 11/00* (2006.01)
*F21V 8/00* (2006.01)

(52) U.S. Cl.
CPC ........ *B29D 11/00701* (2013.01); *G02B 6/004* (2013.01); *G02B 6/0036* (2013.01); *G02B 6/0043* (2013.01); *G02B 6/02033* (2013.01)

(58) Field of Classification Search
CPC .............................. G02B 6/0036; G02B 6/004
See application file for complete search history.

(56) References Cited

U.S. PATENT DOCUMENTS

| 2009/0040428 A1 | 2/2009 | Shimura |
| 2014/0293190 A1 | 10/2014 | Nakashima |
| 2014/0356618 A1 | 12/2014 | Hosoda et al. |
| 2016/0033237 A1 | 2/2016 | Wilenski et al. |

FOREIGN PATENT DOCUMENTS

| JP | 2004145223 A | * | 5/2004 | |
| JP | 2011186413 A | | 9/2011 | |
| KR | 20090069232 A | * | 6/2009 | ............. H04M 1/22 |
| WO | 2017038350 A1 | | 3/2017 | |

OTHER PUBLICATIONS

European Application No. 17925315.8, Extended European search report dated Jan. 11, 2021, 8 pages.

* cited by examiner

*Primary Examiner* — Charlie Y Peng
(74) *Attorney, Agent, or Firm* — Kilpatrick Townsend & Stockton LLP

(57) ABSTRACT

A light guide structure (100) has a first main surface (101) and an opposite second main surface (102) and is configured to guide light in the light guide structure via total internal reflections at the first and the second main surfaces. The light guide structure comprises an out-coupling arrangement (120) configured to couple light propagating in the light guide structure out of it through the first and/or the second main surface. The light guide structure comprises two cladding layers (111$_1$, 111$_2$) and a core layer (110) sandwiched between the cladding layers, the core layer comprising a core material and the cladding layers comprising cladding materials, respectively. The core material has its elasticity higher than the elasticities of the cladding materials, and its refractive index for a design wavelength substantially the same as the refractive indices of the cladding materials.

14 Claims, 4 Drawing Sheets

IMPACT RESISTANT LIGHT GUIDE STRUCTURE

CROSS-REFERENCE TO RELATED APPLICATIONS

The present application is a U.S. national phase application under 35 U.S.C. § 371 of PCT/FI2017/050657, filed on Sep. 15, 2017, the entire contents of which are incorporated by reference herein for all purposes.

BACKGROUND

Light guide films and plates are used in various applications, such as in backlight arrangements for displays, to guide and re-distribute light.

Light may propagate within a light guide film or plate via total internal reflections. For coupling light out of the light guide, various types of optical microfeatures may be incorporated in or on the light guide structure. Such microfeatures and the out-coupling arrangement comprising them may be susceptible to damages caused by point-sized impacts on the light guide.

Local damage of the out-coupling arrangement may cause harmful effects for the operation and/or visual appearance of the light guide and the overall assembly to which the light guide is attached or connected in a device. For example, in the case of a backlight arrangement for a display, such damage may appear as a "white spot" of a dark spot, deteriorating the visual appearance of the display. Susceptibility of the microstructures to damages may even increase when the trend towards larger and larger displays e.g. in mobile devices continues.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In a first aspect, a light guide structure may be implemented which is characterized by what is specified in claim 1. The light guide structure has a first main surface and an opposite second main surface, and it is configured to guide light in the light guide structure via total internal reflections at the first and the second main surfaces.

The light guide structure comprises an out-coupling arrangement configured to couple light propagating in the light guide structure out of it through the first and/or the second main surface.

The light guide structure comprises two cladding layers and a core layer sandwiched between the cladding layers. The core layer comprises a core material, and the cladding layers comprise cladding materials which may be the same. The core material has its elasticity higher than the elasticities of the cladding layers, and its refractive index for a design wavelength substantially the same as the refractive indices of the cladding layers.

In a second aspect, a manufacturing method may be implemented which is characterized by what is specified in claim 15. The method may be used for manufacturing a light guide structure in accordance with the first aspect above.

The method comprises forming the core layer and at least one of the cladding layers by applying a curable substance in substantially liquid form on a solid carrier layer, and curing the thereby applied substance.

DESCRIPTION OF THE DRAWINGS

The present description will be better understood from the following detailed description read in light of the accompanying drawings, wherein.

The drawings of the FIGS. 1 to 5 are not in scale.

DETAILED DESCRIPTION

The detailed description provided below in connection with the appended drawings is intended as a description of a number of embodiments, but it is not intended to represent the only ways in which the embodiments may be constructed, implemented, or utilized.

At least some of the embodiments and examples discussed below may allow, for example, implementing a light guide structure having an out-coupling arrangement, which light guide structure has a high resistance to formation of white spots or other types of defects caused in the out-coupling arrangement due to point-sized or local impacts on the light guide structure.

Such point-sized or local impact may be caused, for example, by an undesired contact occurring between the light guide structure and another element such as a display element to which it is mounted in a device, said another element being initially separated from the light guide structure by a small gap. Such undesired contact may occur, for example, during bending of the device. An impact may also be caused, for example, during the assembly of a display module, by a small particle remained between the light guide film or plate and another element of the display module, to which element the light guide film or plate is attached.

Figure 1:
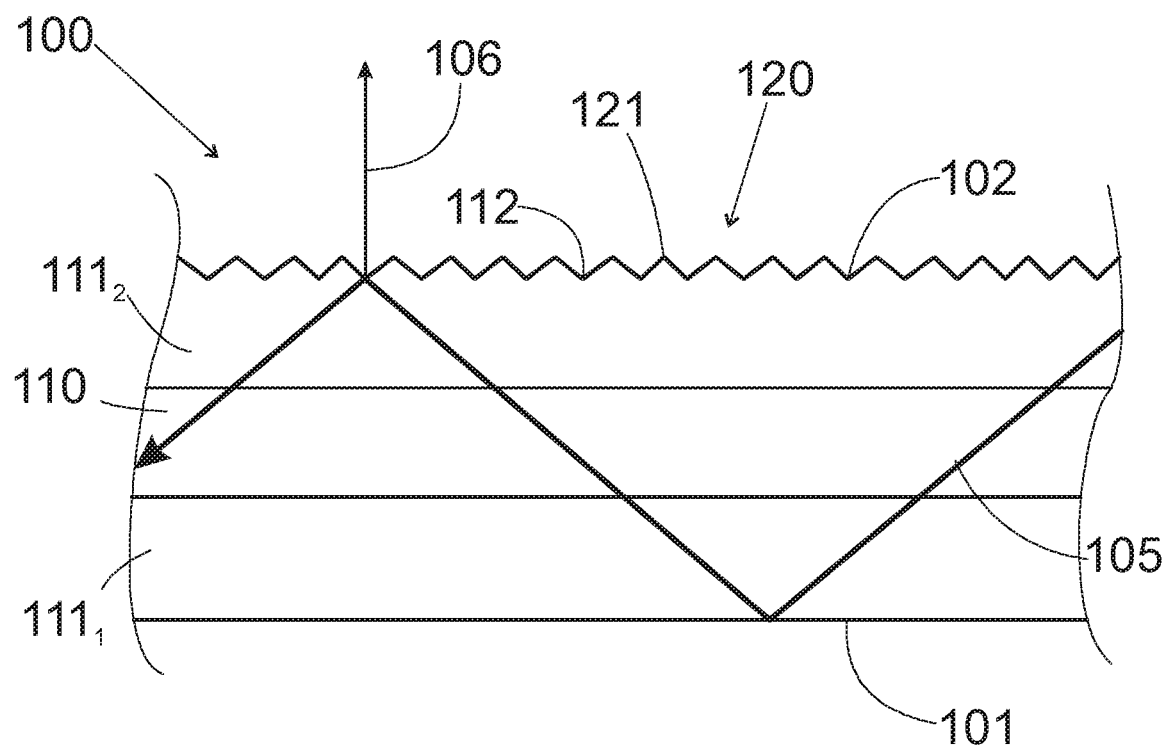
FIGS. 1 to 4 illustrate schematic sectional views of various types of light guide structures with an out-coupling arrangement.

The light guide structure 100 of FIG. 1 has a first main surface 101 and a second main surface 102 lying opposite to the first main surface. In the example of FIG. 1, the first and the second main surfaces are substantially parallel. In other embodiments, the first and second main surfaces of a light guide structure may be directed slightly differently. Then, the light guide structure may be, for example, wedge-shaped. The light guide structure is configured to guide light in the light guide structure via total internal reflections at the first and the second main surfaces, as illustrated by an arrow indicating a light beam 105 in the drawing of FIG. 1.

"Light guide" refers to an optical element suitable and designed for guiding light therein, i.e. within the light guide. "Light guide structure", in turn, refers to a structure which may form part of, or completely, a light guide. A light guide structure may be formed as a rigid element. Alternatively, a light guide may be formed as a flexible and/or bendable element, allowing implementation of a flexible and/or bendable light guide which may be used, for example, in a bendable display assembly or module.

The "first" and the "second main surfaces" of the light guide structure, lying opposite to each other and defining the thickness of the light guide structure, may be regarded as, for example, a lower/bottom and an upper/top surface of the light guide structure. However, it is to be noted that such references to upwards and downwards directions or upper or lower positions, as well as to "horizontal" and "vertical" directions discussed below, shall be understood as being defined relative to coordinates fixed to the light guide structure itself so that the first main surface is the "lower" main surface, and the second main surface is the "upper" main surface. In coordinates fixed to the direction of the gravity of Earth, for example, those surfaces may naturally lie in any direction, depending on the position of the light guide plate. Thus, the terms "vertical" and the "horizontal" shall be understood as auxiliary expressions not necessarily coinciding with horizontal and vertical directions in the coordinates fixed relative to the gravity of Earth, or any other external coordinates.

The light guide structure comprises a core layer 110 which is sandwiched between a first cladding layer $111_1$ and a second cladding layer $111_2$. In the example of FIG. 1, the core layer is in direct contact with both of the cladding layers, thus without any intermediate layer therebetween. In other embodiments, there may be some intermediate layer, for example, for adhesing or some other purposes, between the core layer and one or more of the cladding layers.

A "layer" refers to a structural element of the light guide structure, which structural element extends two-dimensionally in a "horizontal" direction and has a thickness in the "vertical" direction, perpendicular to the horizontal direction, which thickness is substantially lower than the horizontal dimensions of the layer. Thereby, each layer as well as the entire assembly of the two cladding layers sandwiching the core layer therebetween may form a plate-like or sheet-like structure. Such structure may also be considered as a "film".

The light guide structure comprises further an out-coupling arrangement 120 configured to couple light, which propagates in the light guide structure, out of it. Thereby, the out-coupling arrangement may re-distribute, when in use, light received into the light guide structure, again out of the light guide structure, for example, towards a display such as an liquid crystal display (LCD) element. In other applications, light coupled out of a light guide structure may have different purposes.

As illustrated in FIG. 1, the out-coupling arrangement 120 is configured to couple a portion of the energy of light beam 105 incident on it out of the light guide structure, into a sub-beam 106, whereas the rest of the light energy may be reflected by total internal reflection back to the light guide structure. The out-coupling efficiency may be uniform throughout the out-coupling arrangement so that the portion of the incident light energy is constant. Alternatively, the out-coupling efficiency may vary, i.e. be different at different locations or regions of the light guide structure. For example, in the case of receiving light into the light guide structure through an edge surface thereof, the out-coupling efficiency may be lower close to the edge and increase as the distance from the edge increases. Thereby, uniformity of the out-coupled light intensity may be improved.

The out-coupling arrangement of a light guide structure may cover major part or substantially all of the area of the light guide structure. In other embodiments, an out-coupling arrangement may be formed only on a part of, or on several separate regions of, the area of the light guide structure.

An out-coupling arrangement may comprise any appropriate means enabling said function of coupling light out of the light guide structure. In the example of FIG. 1, the out-coupling arrangement 120 comprises optical microfeatures in the form of surface relief microstructures 121 formed on the outer surface 112 of the upper one of the cladding layers, i.e. the second cladding layer $111_2$. In the example of FIG. 1, said outer surface coincides with, and actually forms, the second main surface 102 of the light guide structure.

"Optical microfeatures" refer to microscale structures, patterns, particles, or other types of features which are capable of affecting propagation of light, at least for a predetermined design wavelength, so that the light propagating within the light guide structure and being incident on such optical microfeature(s) is at least partially coupled out of the light guide structure. "Micro" and "microscale" refer to features which have at least some characteristic dimension sized, with regard to a predetermined design wavelength for which the light guide structure is designed, in the range of sub-wavelength dimensions to some tens of wavelengths.

Said affecting the propagation of light may be based, for example, on refraction, reflection, scattering, or diffraction of the light interacting with the optical microfeatures.

Figure 3:
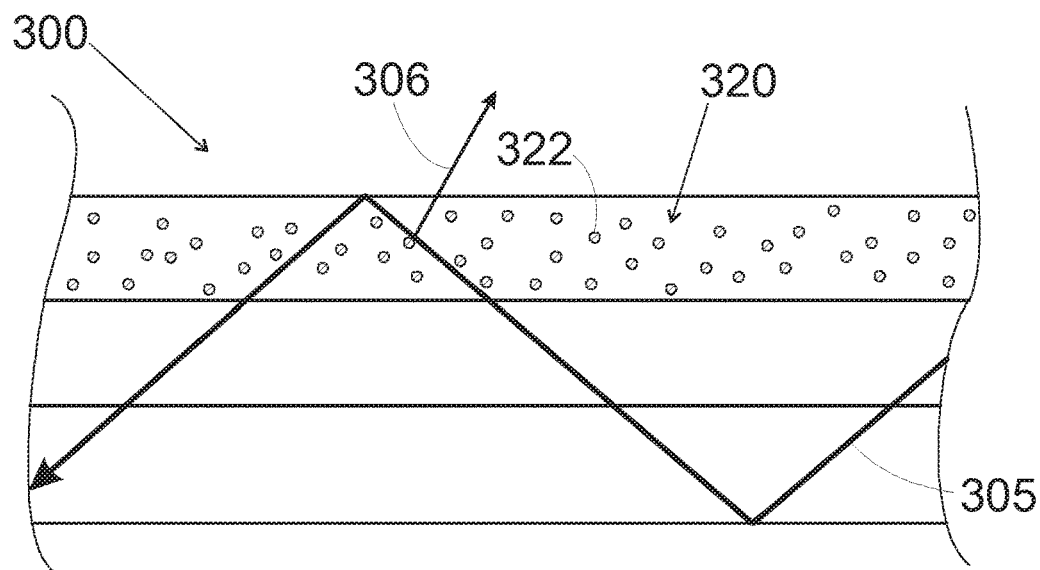

A plurality of optical microfeatures may be arranged in the light guide structure with a regular, quasi-regular, or irregular distribution. In the case of a regular distribution, a plurality of microfeatures may be arranged, for example, in a periodic grid or grating. The optical microfeatures may lie substantially on or along one plane which may be directed parallel to the first and/or the second main surfaces of the light guide structure, as is the case in the light guide structure 100 of FIG. 1. In other embodiments, optical microfeatures may be distributed on or along several different planes which may be directed differently from the first and/or the second main surfaces of the light guide structure. In yet other embodiments, optical microfeatures may be distributed within an out-coupling volume. One example of the latter is illustrated in FIG. 3.

In the example of FIG. 1, the out-coupling arrangement 120 comprising the microstructures 121 on the second main surface 102 is configured to direct the out-coupled light out of the light guide through the second main surface itself. Thus, the light is coupled out of the light guide structure to that side of the light guide structure on which side the out-coupling arrangement lies. In other embodiments, an out-coupling arrangement may be configured to couple light out of a light guide structure to the side of the light guide structure which is opposite to that side on which the out-coupling arrangement lies. For example, in the case of an out-coupling structure comprising surface relief microstructures on the second or first main surface similarly to the example of FIG. 1, the microstructures may direct part of incident light through the light guide structure and out of it through the opposite first or second main surface, respectively.

Microstructures, i.e. structural microfeatures, may comprise any appropriate types of dots, lines, grooves, ridges, or the like. In the example of FIG. 1, the microstructures are illustrated as substantially pyramid-shaped protrusions. In other embodiments, structural microfeatures may have structures or patterns with two different height levels, i.e. binary structures. Alternatively, the optical microfeatures may have multi-level height variations with a plurality of discrete height levels, or they may have continuously or gradually varying height levels.

In other embodiments, other types of optical microfeatures may be used, such as scattering, reflective, or refractive particles distributed within or on one or more of the layers of a light guide structure. One example is illustrated in FIG. 3.

The light guide structure 300 of FIG. 3 differs from that of FIG. 1 in that instead of surface relief microfeatures on a surface of one of the cladding layers, the out-coupling arrangement 320 comprises scattering particles 322 distributed within the second or upper cladding layer. The second cladding layer thereby serves as an out-coupling volume. A light guide structure with such scattering particles may be used, for example, to provide diffuse light, i.e. light directed substantially randomly into a range of solid angles. In the drawing of FIG. 3, this is illustrated by arrows indicating a light beam 305 propagating in the light guide structure 300, and a randomly oriented sub-beam 306 into which a part of the light energy of the light beam is coupled out of the light guide structure.

In other embodiments, an out-coupling arrangement may comprise any appropriate other types of optical microfeatures. In the vertical or thickness direction, an out-coupling arrangement in general as well as optical microfeatures thereof may be located as embedded within a light guide structure or on, or close to, the first and/or the second main surfaces of the light guide structure.

Figure 4:
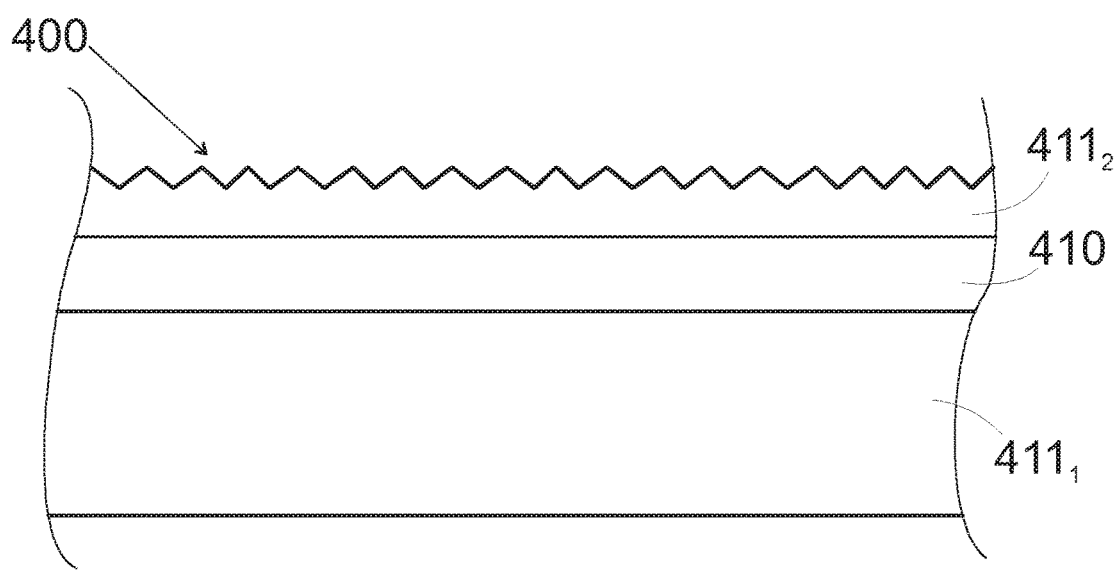

The core layer 110 comprises, and may be completely formed of, a core material. The first cladding layer $111_1$ comprises, and may be completely formed of, a cladding material. Correspondingly, the second cladding layer $111_2$ comprises, and may be completely formed of, a cladding material. The cladding materials of the first and the second cladding layers may be the same. In other embodiments, cladding materials of different cladding layers may have more or less different compositions or they may be completely different materials. An example of implementation of a light guide structure with such different cladding materials is illustrated in FIG. 4.

The refractive indices of the core material of the core layer 110 and the cladding materials of the cladding layers $111_1$, $111_2$ are substantially the same, at least for a design wavelength. Then, the entire stack of those three layers may serve, from optical point of view, as substantially one single body or optical element where the different layers are optically similar. In other words, light may propagate from one layer to another without any substantial reflection or refraction at the interface between the two layers. As far as this condition is met, the cladding materials may have their refractive indices slightly different from each other.

"Refractive index" n of a material refers to the ratio of speed of light in vacuum, c, and the phase velocity v of light in the material: n=c/v. In reality, each non-ideal material causes at least some losses of the light energy propagating in the material. This attenuating effect may be expressed by means of complex refractive index $\underline{n}$ which also takes into account the losses via an imaginary part in the form of extinction coefficient κ: $\underline{n}$=n+iκ.

To provide said optical similarity, the materials of the core and the cladding layers may be selected so that the real part of the complex refractive index of the core material for the design wavelength deviates by 1% or less, preferably by 0.5% or less, from the real parts of the complex refractive indices of the cladding materials of the first and the second cladding layers for the design wavelength.

On the other hand, the materials of the core and the cladding layers may be selected so that the imaginary part of the complex refractive index of the core material for the design wavelength deviates by 0.5% or less, preferably by 0.3% or less, from the imaginary parts of the complex refractive indices of the cladding materials of the first and the second cladding layers for the design wavelength.

In practice, refractive index and complex refractive index always depend on the wavelength, i.e. they may be more or less different for different wavelengths. In the above, the similarity of the refractive indices and complex refractive indices of the core and the cladding materials concern similarity thereof at least at a predetermined design wavelength for which the light guide structure is designed. Such design wavelength refers to the intended wavelength with which the light guide structure is intended to operate. The design wavelength may lie, for example, at the visible wavelength range or at the infrared wavelength range.

Such small maximum deviations in the real and/or imaginary parts of the complex refractive index between the materials of the core layer and the cladding layers between which the core layer is sandwiched, may keep the interface effects, which light propagating from one layer to another experiences, sufficiently small.

In the case of intermediate layer(s) present between a core layer and at least one cladding layer, it is preferable to have the material(s) of the intermediate layer(s) selected so as to achieve sufficient optical similarity also between the intermediate layer, and the core and the cladding layers.

In contrast to the optical similarity, the mechanical properties of the materials of the core and the cladding layers are different in that the core material has elasticity which is higher than elasticities of both of the cladding materials.

As commonly known, elasticity of a material affects the rigidity of a body formed of that material, i.e. the capability of the body to resist deformation in response to a force applied thereon. Thus, in the case of similar force applied on two bodies with the same shape and dimensions, the one being formed of a material with higher elasticity than the other one shows higher deformation. Generally speaking, elasticity may be considered as relating to the stiffness of a material.

In the case of an impact falling or applied on the light guide structure, the different elasticity properties of the core and the cladding layers may serve for different purposes. A less elastic cladding layer may re-distribute the energy of a local, small-sized or point-sized impact into a larger area, whereas the more elastic core layer may then absorb the impact energy by deforming. In result, resistance of the optical layer structure to impact-induced defects in the out-coupling arrangement may be reduced in comparison to a light guide structure with similar thickness but formed entirely of one single material.

To provide said mechanical difference between the different layers, the materials of the core and the cladding layers may be selected so that at least one, possibly both of the cladding materials of the first and the second cladding layers (which may be the same material) has Young's modulus which is at least 50% higher, preferably at least 75% higher, than the Young's modulus of the core material.

There are different possibilities for selection of the core and the cladding materials so that appropriate optical similarity and mechanical difference are achieved. First, the materials of the different layers may be selected from clearly different materials or material types. On the other hand, the mechanical properties of various optical materials may be adjusted by appropriate additives affecting the composition and mechanical properties of the material while not substantially changing the refractive index. Thereby, the materials with different mechanical properties may be basically the same, but may differ in their accurate compositions sufficiently to achieve the desired difference in the elasticity.

Optical properties such as refractive index and complex refractive index of a material may be affected and they may be adjusted, for example, by adding color agents and/or suitable nanoparticles into the material. Nanoparticles may be selected so as to have different optical properties than the bulk material into which they are added, but a size which does not cause substantial scattering of light at the design wavelength. One common example of nanoparticles suitable for use as such additive is $TiO_2$ nanoparticles.

Mechanical properties such as Young's modulus of core and cladding materials may be affected, for example, by selecting monomers or oligomers with different mechanical properties as a base substance of those materials. Further, also suitable additives may be used. For example, for PMMA as a cladding material, plasticizers or comonomers such as butyl acetate may be used.

Additives may be added to the material, for example, during its manufacturing. In the case of materials formable from curable substances which are initially in liquid form, additives may be added into the liquid substance before curing thereof.

At least one of the cladding materials may comprise polycarbonate, polyethylene terephthalate PET, acrylic such as poly(methyl methacrylate) PMMA, or glass. Suitable glass materials are commercially available, for example, with trade names Corning® Willow® Glass, SCHOTT AF 32® eco, and SCHOTT AS 87 eco.

The core layer may comprise, for example, silicone or thermoplastic urethane TPU.

Figure 2:
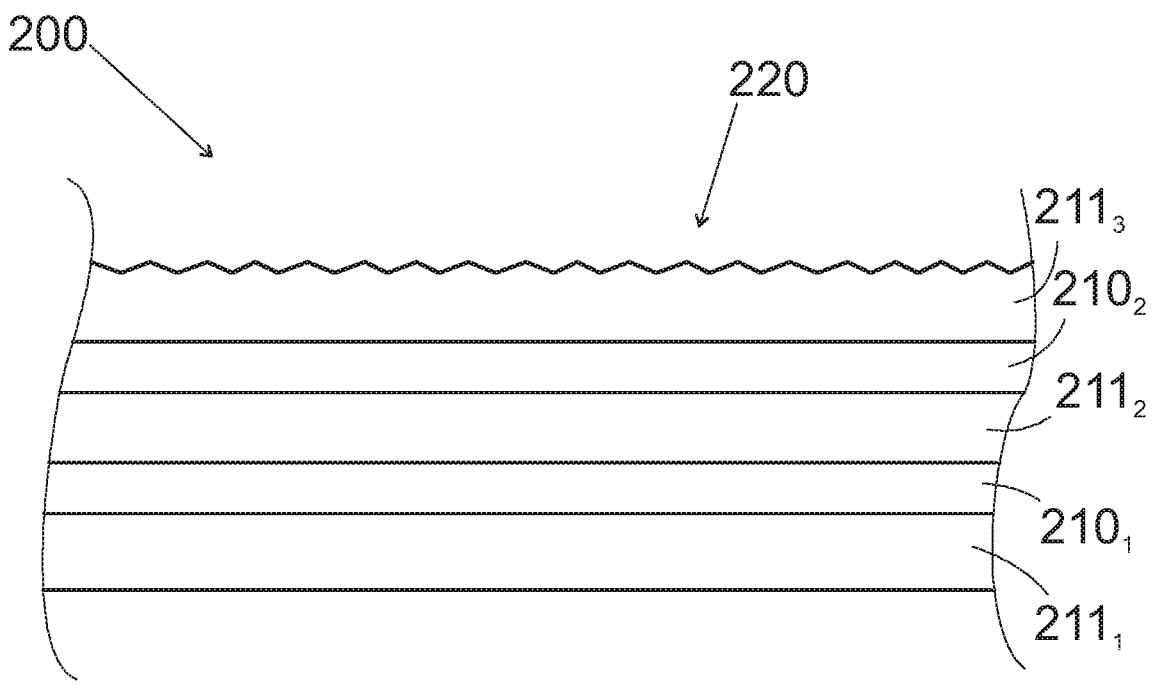

In the example of FIG. 1, there are altogether three layers in the light guide structure. Another possibility is illustrated in FIG. 2. The light guide structure 200 of FIG. 2 illustrates from that of FIG. 1 in that it comprises two core layers $210_1$, $210_2$ and three cladding layers $211_1$, $211_2$, $211_3$. Each core layer is sandwiched between two cladding layers so that the middle cladding layer $211_2$ serves as a cladding layer for both of the core layers $210_1$, $210_2$. Such combination of two core layers and three cladding layers is one but not the only possible example of a light guide structure comprising a plurality of alternating core layers and cladding layers. In other embodiments, light guide structures may be implemented with any other appropriate number of core layers, each being sandwiched between two cladding layers. For each core layer and the two cladding layers adjacent to it, the optical similarity and mechanical difference of the materials of those three layers may be arranged as discussed above.

The out-coupling arrangement 220 of the light guide structure 200 of FIG. 2 may be similar to that discussed above with reference to FIG. 1. In other embodiments, instead of surface relief microstructures on the first or the second main surface of a light guide structure, a light guide structure comprising a plurality of alternating core layers and cladding layers may comprise any other appropriate type of out-coupling arrangement, such as that discussed above with reference to FIG. 3.

A plurality of alternating core layers and cladding layers may further improve the impact resistance performance of a light guide structure in comparison to a three-layer construction. On the other hand, a plurality of alternating core layers and cladding layers may enable having, for example, various core layers with mutually different mechanical properties, which may provide more flexible possibilities for the design of the mechanical properties of the light guide structure.

The light guide structure 400 of FIG. 4 may be basically similar to that of FIG. 1. However, the cladding materials of the first and the second cladding layers $411_1$, $411_2$, are different at least in their accurate compositions. The core layer 410 and the upper or second cladding layer $411_2$ are formed on a carrier layer serving as the first or lower cladding layer $411_1$. A carrier layer may be comprise, and it may be entirely formed, for example, polycarbonate, PET, acrylic such as PMMA, TPU, or glass. Suitable glass materials are commercially available, for example, with trade names Corning® Willow® Glass, SCHOTT AF 32® eco, and SCHOTT AS 87 eco.

In other embodiments, a cladding layer serving as one the cladding layers may comprise a cladding material which is the same as the cladding material of one or more of the other cladding layers of a light guide structure.

Although not illustrated in the drawings, also any of the light guide structures discussed above with reference to FIGS. 1 to 3 may be formed and lie on a carrier layer. In such embodiments, the carrier layer however does not serve as one cladding layer of the light guide structure and is therefore not part of the actual light guide structure.

As illustrated in FIG. 4, in the case of a carrier layer serving as one of the cladding layers, the carrier layer may have a thickness which is substantially higher than the thicknesses of the core layer(s) and other cladding layer(s). This may ensure sufficient rigidity of the complete light guide structure. On the other hand, sufficient thickness may be required to prevent breakage or damaging of the carrier layer in the manufacturing process of the light guide structure.

Basically, a light guide structure may have a total thickness, for example, of 0.15 to 0.5 mm. In many applications, suitable thickness may lie in the range of 0.2 to 0.3 mm. In the case of a carrier layer serving as one of the cladding layers, the carrier layer may cover, for example, half or more, even 90% of the total thickness of the light guide structure.

The out-coupling arrangement of the light guide structure 400 of FIG. 4 may be similar to that discussed above with reference to FIG. 1. In other embodiments, instead of surface relief microstructures on the first or the second main surface of a light guide structure, a light guide structure comprising a carrier layer serving as one of the cladding layers may comprise any other appropriate type of out-coupling arrangement, such as that discussed above with reference to FIG. 3.

In the above and also other embodiments, the out-coupling arrangement of a light guide structure may basically comprise any appropriate reflective, refractive, diffractive, and/or scattering optical arrangements or elements configured to couple light propagating in the light channels out of the light guide structure. The out-coupling arrangement may be implemented as one single, continuous structure or arrangement which covers the entire area of the light guide structure, or a part of that area only. It may alternatively comprise a plurality of separate out-coupling elements or sub-arrangements.

Figure 5:
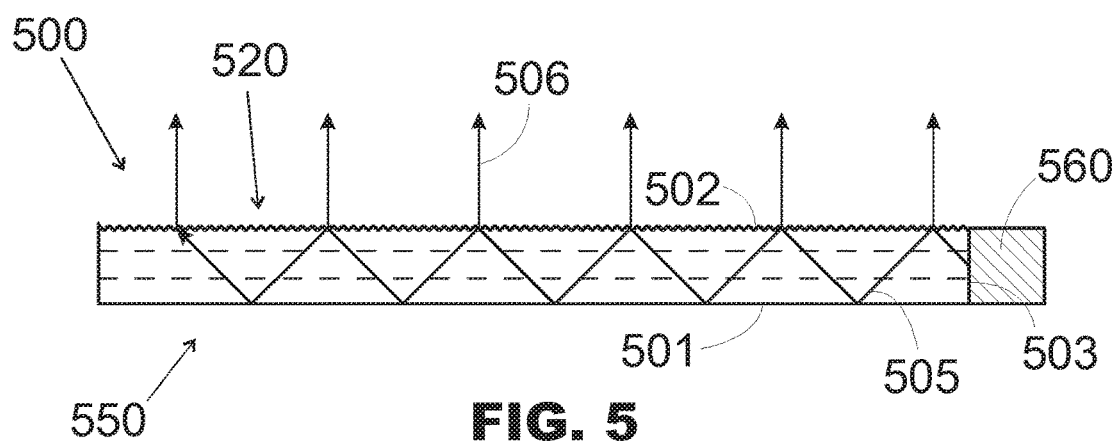
FIG. 5 illustrates a schematic sectional view of a backlight module incorporating a light guide structure.

The backlight module 550 of FIG. 5 may be used, for example, as a backlight arrangement for a display element such as a liquid crystal display LCD element or any variant of such.

The backlight module 550 comprises a light guide structure 500. In the drawing of FIG. 5, the light guide structure 500 is illustrated as having three layers and an out-coupling arrangement 520 with surface relief microstructures serving as optical microfeatures. The light guide structure may thus be basically in accordance with those discussed above with reference to FIGS. 1 and 4. In other embodiments, a backlight module may comprise a light guide structure which is in accordance with any of those discussed above, such as those discussed above with reference to FIGS. 2 and 3.

The backlight module 550 further comprises a light source element 560 which may comprise any appropriate light emitting element(s) and/or component(s), such as LED (s). Basically, any appropriate configuration of a light source element suitable for backlight modules may be used.

The light source element 560 is attached to an edge of the light structure, and configured to emit light to the light guide structure 500 through an edge surface 503 thereof. Such light may then propagate in the light guide via total internal reflections at the first and the second main surfaces 501, 502 thereof, as illustrated by an arrow indicating a light beam 505. At each interaction with the out-coupling arrangement 520, part of the light energy of the light beam is coupled out of the light guide structure 500, into a sub-beam 506.

Figure 6:
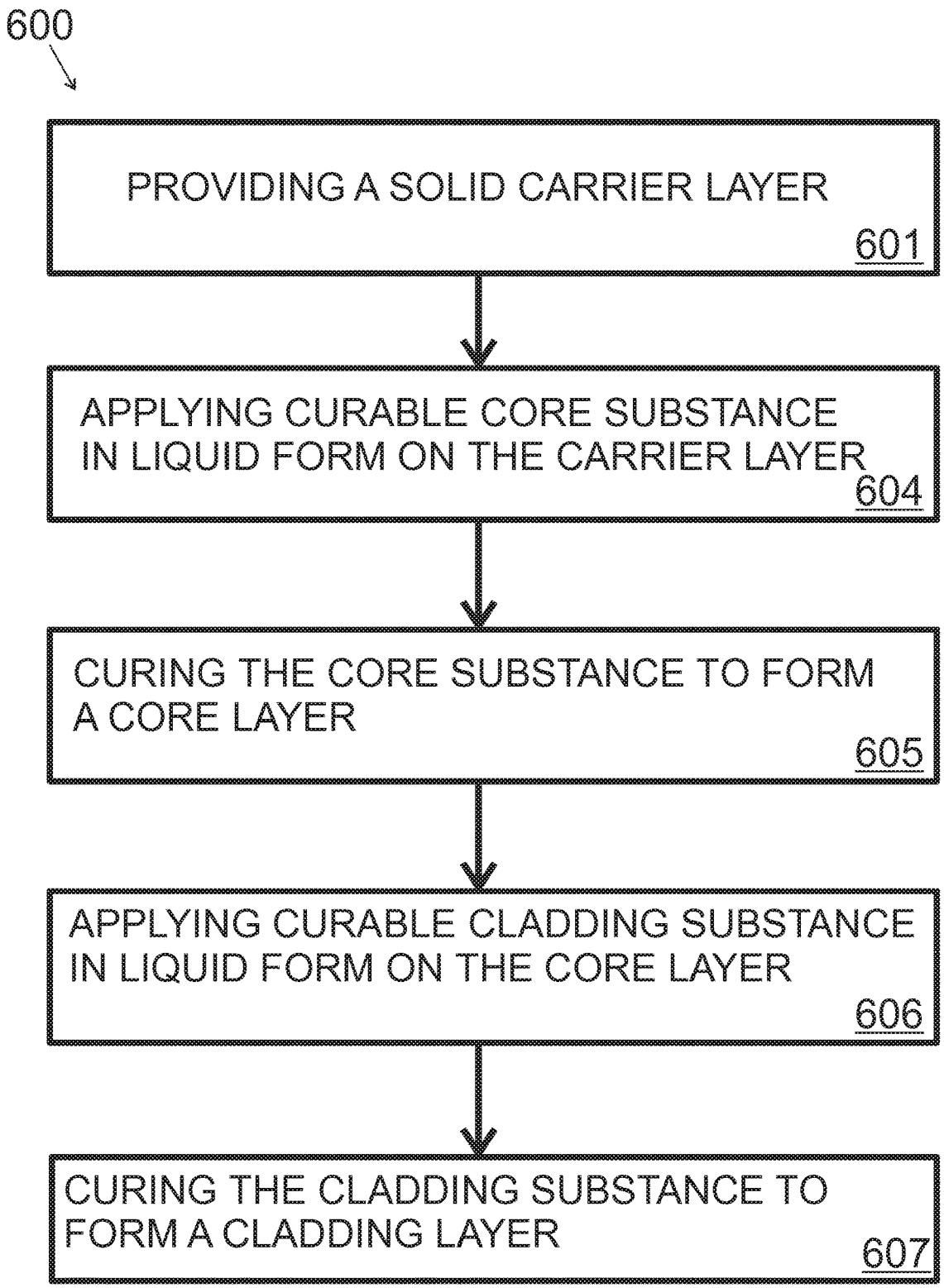
FIGS. 6 and 7 illustrate flow diagrams of methods for manufacturing a light guide structure.

The method 600 of FIG. 6 may be used to manufacture a light guide structure which may be, for example, in accordance with any of those discussed above with reference to FIG. 4.

The method 600 may be carried out, for example, in a roll-to-roll process where the light guide structure is formed as a long, bendable sheet which can be cut into discrete light guides afterwards. In other embodiments, light guide components may be manufactured directly as discrete components.

The method comprises, in operation 601, applying a solid carrier layer which may comprise or be formed of, for example, polycarbonate, PET, acrylic, TPU, or glass.

In operation 604, curable core substance is applied in substantially liquid form on the solid carrier layer and is then cured, in operation 605, to form a core layer. In operation 606, curable cladding substance is applied in substantially liquid form on the solid carrier layer and the core layer already formed thereon. In operation 607, it is cured to form a cladding layer.

The curable core and cladding substances may be curable, for example, by means of heat or ultraviolet light. Alternatively, a curable substance may be a solvent-based substance curing when the solvent evaporates. The curable substances may be selected so as to make the core and cladding layers comprise those core and cladding materials discussed above with reference to FIG. 1.

Applying as initially liquid form enables adjustment of the layer thicknesses. Further, it may enable adjustment of the mechanical and possibly also the optical properties of the different layers by adjusting the accurate compositions of the curable core and cladding substances as discussed above with reference to FIG. 1.

In the example of FIG. 6, the carrier layer forms one of the cladding layers in the completed light guide structure. Another approach is illustrated in FIG. 7.

Figure 7:
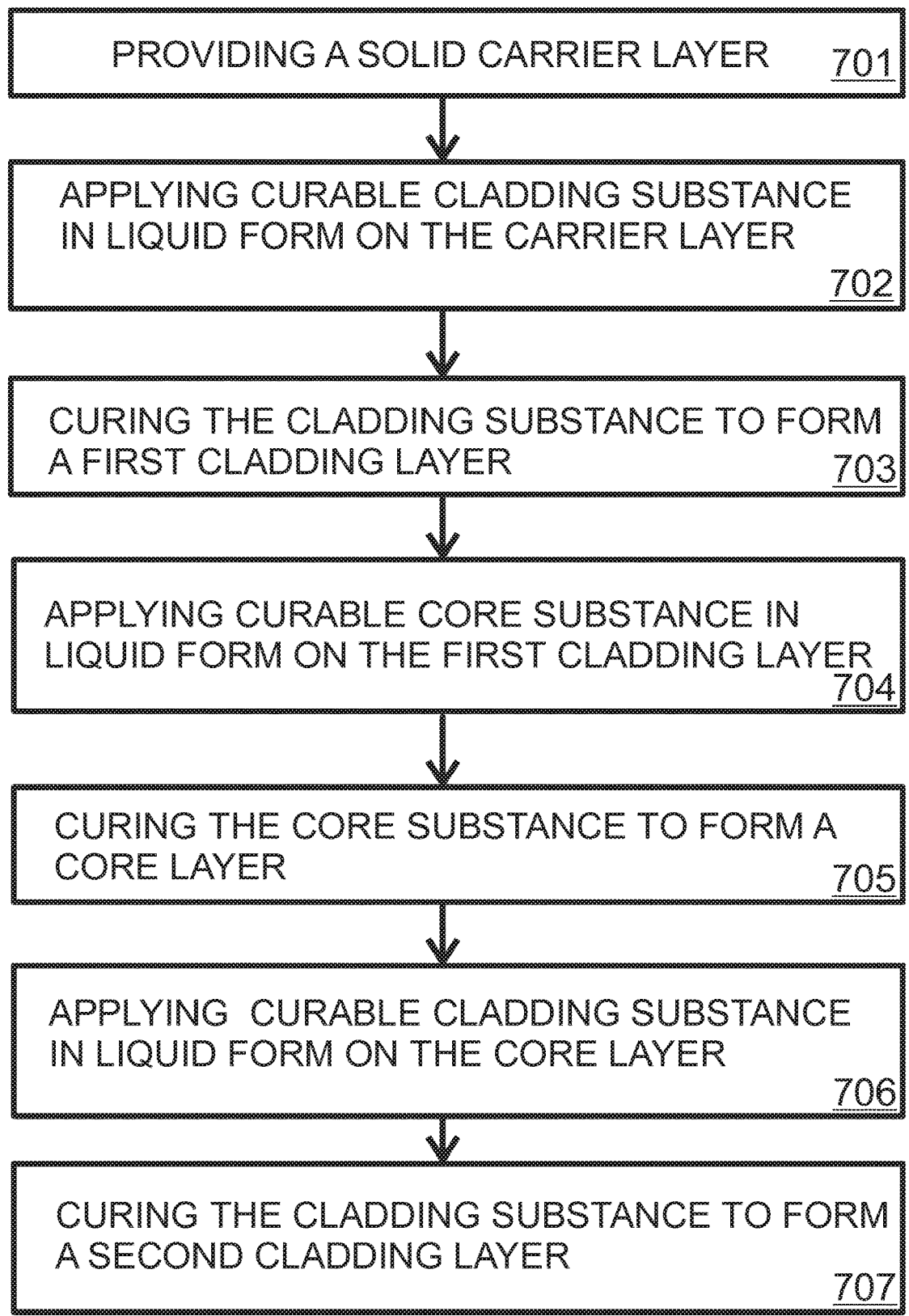

The method 700 of FIG. 7 may be used, for example, for manufacturing a light guide structure which may be, for example, in accordance with any of those discussed above with reference to FIGS. 1 and 3.

The method 700 of FIG. 7 differs from that of FIG. 6 in that before applying curable core substance, curable cladding material is applied in substantially liquid form on the solid carrier layer in operation 702, and is cured in operation 703 to form a first cladding layer.

The next operations are similar to the corresponding operations discussed above with reference to FIG. 6. In operations 704 and 705, curable core substance is applied in substantially liquid form on the solid carrier layer and the cladding layer already formed thereon, and is then cured to form a core layer. In operation 707, curable cladding substance which may be the same as or different from the curable cladding substance applied in operation 702, is applied in substantially liquid form on the solid carrier layer and the first cladding layer and core layer already formed thereon. In operation 707, it is cured to form a second cladding layer.

The carrier layer may be removed from the completed stack of the core and the carrier layers. Alternatively, the completed light guide structure may remain lying on the carrier layer.

In other embodiments which may be basically in accordance with any of those methods discussed above with reference to FIGS. 6 and 7, a plurality of alternating core and cladding layers may be formed sequentially on top of each other. Thereby, a light guide structure in accordance with those discussed above with reference to FIG. 2 may be manufactured.

In the methods discussed above, an out-coupling arrangement may be formed in the light guide structure by means of any appropriate technique.

For example, in the case of scattering, reflective, or refractive particles distributed within or on one or more of the core and cladding layers, such particles to form optical microfeatures may be mixed in the curable substance for the associated layer before applying it, or added onto already applied substance, before or after the curing operation.

In the case of surface relief microstructures as optical microfeatures, the microstructures may be formed, for example, by feeding a layer of curable core or cladding material over a pressing roll having a replication tool attached thereon. Such replication tool may have surface texture complementarily corresponding to the desired microstructures to be formed on the core or cladding layer at issue. UV light and/or heat, for example, may be applied to the contact area of the curable substance and the pressing roll to cure the layer. Instead of such roll-to-roll compatible approach, a pressing tool and a layer of curable substance on a discrete sheet of a carrier layer may be brought into contact with each other to form the microstructures.

Some embodiments are further discussed shortly in the following.

A light guide structure has a first main surface and an opposite second main surface and is configured to guide light in the light guide structure via total internal reflections at the first and the second main surfaces. The light guide structure comprises an out-coupling arrangement configured to couple light propagating in the light guide structure out of it through the first and/or the second main surface. The light guide structure comprises two cladding layers and a core layer sandwiched between the cladding layers, the core layer comprising a core material and the cladding layers comprising cladding materials, respectively. The core material has its elasticity higher than the elasticities of the cladding materials, and its refractive index for a design wavelength substantially the same as the refractive indices of the cladding materials for the design wavelength.

In an embodiment, at least one of the cladding materials has Young's modulus which is at least 50% higher than that of the core material.

In an embodiment, which may be in accordance with the previous embodiment, the real part of the complex refractive index of the core material for the design wavelength deviates by 1% at a maximum from the real parts of the complex refractive indices of the cladding materials for the design wavelength.

In an embodiment, which may be in accordance with any of the previous embodiments, the imaginary part of the complex refractive index of the core material for the design wavelength deviates by 0.5% at a maximum from the imaginary parts of the complex refractive indices of the cladding materials for the design wavelength.

In an embodiment, which may be in accordance with any of the previous embodiments the core layer is in direct contact with at least one of the cladding layers.

In an embodiment, which may be in accordance with any of the previous embodiments, at least one of the cladding materials comprises polycarbonate, polyethylene terephthalate, acrylic, or glass.

In an embodiment, which may be in accordance with any of the previous embodiments, the core material comprises silicone or thermoplastic urethane.

In an embodiment, which may be in accordance with any of the previous embodiments, the core layer lies on a carrier layer serving as one of the cladding layers, the other cladding layer lies on the core layer, and the cladding materials of the two cladding layers have different compositions.

In an embodiment, which may be in accordance with any of the previous embodiments except of the previous one, the cladding materials of the cladding layers have the same composition.

In an embodiment, which may be in accordance with any of the previous embodiments, the light guide structure comprises a plurality of alternating core layers and cladding layers.

In an embodiment, which may be in accordance with any of the previous embodiments, the out-coupling arrangement comprises optical microfeatures. In an embodiment, the optical microfeatures comprise surface relief microstructures formed on at least one of the surfaces of the core and the cladding layers. In an embodiment, at least a part of the surface relief microstructures are formed on the first or the second main surfaces of the light guide structure.

A backlight module comprises a light guide structure as defined in any of the embodiments above.

A method for manufacturing a light guide structure as defined in any of the light guide embodiments above comprises forming the core layer and at least one of the cladding layers by applying, for each of the core layer and the at least one of the cladding layers, a curable substance in substantially liquid form on a solid carrier layer, and curing the thereby applied substance.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

The invention claimed is:

1. A light guide structure comprising a first main surface and an opposite second main surface, configured to guide light in the light guide structure via total internal reflections at the first main surface and the second main surface, the light guide structure comprising an out-coupling arrangement configured to couple light propagating in the light guide structure out of it through at least one of the first main surface or the second main surface,
   wherein the light guide structure comprises two cladding layers and a core layer sandwiched between the cladding layers, the core layer comprising a core material and the cladding layers comprising cladding materials, respectively, the core material having its elasticity higher than elasticities of the cladding materials, and a refractive index for a design wavelength is substantially the same as refractive indices of the cladding materials for the design wavelength, the light guide structure comprising a plurality of alternating core layers and cladding layers.

2. The light guide structure as defined in claim 1, wherein at least one of the cladding materials has a Young's modulus which is at least 50% higher than a Young's modulus of the core material.

3. The light guide structure as defined in claim 1, wherein a real part of a complex refractive index of the core material for the design wavelength deviates by 1% at a maximum from real parts of complex refractive indices of the cladding materials for the design wavelength.

4. The light guide structure as defined in claim 1, wherein an imaginary part of a complex refractive index of the core material for the design wavelength deviates by 0.5% at a maximum from imaginary parts of complex refractive indices of the cladding materials for the design wavelength.

5. The light guide structure as defined in claim 1, wherein the core layer is in direct contact with at least one of the cladding layers.

6. The light guide structure as defined in claim 1, wherein at least one of the cladding materials comprises polycarbonate, polyethylene terephthalate, acrylic, or glass.

7. The light guide structure as defined in claim 1, wherein the core material comprises silicone or thermoplastic urethane.

8. The light guide structure as defined in claim 1, wherein the core layer lies on a carrier layer serving as a first one of the cladding layers, wherein a second one of the cladding layers lies on the core layer, and the cladding materials of the two cladding layers have different compositions.

9. The light guide structure as defined in claim 1, wherein the cladding materials of the cladding layers have the same composition.

10. The light guide structure as defined in claim 1, wherein an out-coupling arrangement comprises optical microfeatures.

11. The light guide structure as defined in claim 10, wherein the optical microfeatures comprise surface relief microstructures formed on at least one of the surfaces of the core or the cladding layers.

12. The light guide structure as defined in claim 11, wherein at least a part of the surface relief microstructures are formed on the first main surface or the second main surface of the light guide structure.

13. A backlight module comprising the light guide structure as defined in claim 1.

14. A method for manufacturing the light guide structure as defined in claim 1, comprising forming the core layer and at least one of the cladding layers by applying, for each of the core layer and the at least one of the cladding layers, a curable substance in substantially liquid form on a solid carrier layer, and curing the thereby applied substance.

* * * * *